(12) United States Patent
Argudyaev et al.

(10) Patent No.: US 8,854,179 B2
(45) Date of Patent: Oct. 7, 2014

(54) HOUSEHOLD APPLIANCE WITH FINGERPRINT SENSOR

(75) Inventors: Sergey Argudyaev, St. Petersburg (RU); Kersten Kaiser, Rothenburg ob der Tauber (DE)

(73) Assignee: Electrolux Home Products Corporation N.V., Zaventem (BE)

( * ) Notice: Subject to any disclaimer, the term of this patent is extended or adjusted under 35 U.S.C. 154(b) by 1288 days.

(21) Appl. No.: 12/295,445

(22) PCT Filed: Oct. 5, 2006

(86) PCT No.: PCT/EP2006/009639
§ 371 (c)(1),
(2), (4) Date: Aug. 9, 2010

(87) PCT Pub. No.: WO2007/115589
PCT Pub. Date: Oct. 18, 2007

(65) Prior Publication Data
US 2010/0321152 A1    Dec. 23, 2010

(30) Foreign Application Priority Data
Apr. 10, 2006  (RU) ................................ 2006111646

(51) Int. Cl.
*G05B 19/00*  (2006.01)
*H04Q 1/00*  (2006.01)
*G06K 9/00*  (2006.01)

(52) U.S. Cl.
CPC ........ *G06K 9/00046* (2013.01); *G06K 9/00053* (2013.01)
USPC ........ 340/5.53; 340/5.52; 340/5.82; 382/116; 382/124

(58) Field of Classification Search
CPC ...... G06F 21/32; G06K 9/00053; G06K 9/00; G06K 9/00006; G06Q 20/40145
USPC .................. 340/5.53, 5.8, 5.52; 381/116, 124
See application file for complete search history.

(56) References Cited

U.S. PATENT DOCUMENTS 5,732,148 A * 3/1998 Keagy et al. ................... 382/124
6,259,108 B1 * 7/2001 Antonelli et al. ............. 250/556
(Continued)

FOREIGN PATENT DOCUMENTS

DE   19903919 A1   8/2000
EP   0945821 A2    9/1999
(Continued)

OTHER PUBLICATIONS

Maltoni et al. "Handbook of Fingerprint Recognition". Springer Verlag, US, 2003, pp. 59-64.
(Continued)

*Primary Examiner* — George Bugg
*Assistant Examiner* — Munear Akki
(74) *Attorney, Agent, or Firm* — Pearne & Gordon LLP

(57) ABSTRACT

The present invention relates to a household appliance (10) such as an oven, a refrigerator, or a washing machine. The household appliance comprises a transparent casing element (12) and a fingerprint sensor (20) mounted to the inside of an exterior surface of said casing element (12). The sensor comprises a light source (21; 21'; 21"; 21''') emitting light for which said casing element (12) is transparent, a detector (23; 23"; 23''') for detecting reflected light emitted from said light source (21; 21'; 21"; 21''') and a light guiding means (22; 22'; 22"; 22'''; 22b''') for guiding emitted light from said light source (21; 21'; 21"; 21''') towards the casing element (12) and guiding light reflected at the exterior surface of the casing element (12) to the detector (23; 23"; 23'''). Thereby detection of a fingerprint image through said casing element (12) is rendered possible.

20 Claims, 5 Drawing Sheets

(56) References Cited

U.S. PATENT DOCUMENTS

| | | | |
|---|---|---|---|
| 6,792,287 B1 * | 9/2004 | Tuomela et al. | 455/556.1 |
| 7,068,145 B2 * | 6/2006 | Reitmeier | 340/5.53 |
| 7,181,053 B2 * | 2/2007 | Wang et al. | 382/124 |
| 7,636,852 B1 * | 12/2009 | Balasubramanian et al. | 713/183 |
| 7,636,853 B2 * | 12/2009 | Cluts et al. | 713/186 |
| 7,980,378 B2 * | 7/2011 | Jones et al. | 194/217 |
| 8,027,519 B2 * | 9/2011 | Maro et al. | 382/115 |
| 2001/0050765 A1 | 12/2001 | Antonelli et al. | |
| 2002/0163506 A1 * | 11/2002 | Matusis | 345/173 |
| 2004/0160335 A1 | 8/2004 | Reitmeier | |
| 2004/0169938 A1 | 9/2004 | Nakamura | |
| 2004/0205351 A1 * | 10/2004 | Koide et al. | 713/186 |
| 2005/0015620 A1 | 1/2005 | Edison | |
| 2005/0089204 A1 * | 4/2005 | Carver et al. | 382/127 |
| 2007/0081696 A1 * | 4/2007 | Brennan et al. | 382/115 |
| 2007/0273475 A9 * | 11/2007 | Neumann | 340/5.52 |
| 2008/0100936 A1 * | 5/2008 | Theytaz et al. | 359/838 |
| 2008/0152196 A1 * | 6/2008 | Saliba et al. | 382/115 |
| 2008/0184719 A1 * | 8/2008 | Lowenstein | 62/127 |
| 2010/0275625 A1 * | 11/2010 | Lowenstein | 62/127 |
| 2011/0137657 A1 * | 6/2011 | Cenedese et al. | 704/275 |

FOREIGN PATENT DOCUMENTS

| | | |
|---|---|---|
| EP | 0949578 A2 | 10/1999 |
| JP | 7334649 | 12/1995 |
| KR | 20060014825 | 2/2006 |
| WO | 9743607 A | 11/1997 |
| WO | 9909514 | 2/1999 |

OTHER PUBLICATIONS

International Search Report for PCT/EP2006/009639 dated Dec. 29, 2006, 2 pages.

Translation of Russian Office Action for application No. 2006111646 dated Mar. 23, 2010.

* cited by examiner

HOUSEHOLD APPLIANCE WITH FINGERPRINT SENSOR

TECHNICAL FIELD

The present invention relates to a household appliance with a fingerprint sensor.

TECHNICAL BACKGROUND

For some types of home appliances it is important to have a user detection or recognition functionality, so than an appliance can recognize who is using it, in order to enable e.g. personalization and authorization features. For example, it is hereby possible to activate a user specific user profile. Similarly, it also possible to increase the safety level, e.g. by restricting the use for children for hazardous equipment, such as stoves and ovens, or restrict the access to certain compartments, such as e.g. the inner compartment of a wine refrigerator. It is also possible to restrict the use of the household appliance for certain persons or groups of persons, and/or to restrict the use of the household appliance during certain time periods.

Further, many types of biometric person-identifying devices and methods are per se known, based e.g. on the person's fingerprint, voice characteristics or iris pattern. Among the existing methods of person identification, fingerprint recognition is the cheapest, most accurate and feasible. For sensing fingerprint patterns, various techniques have been relied on, such as optical imaging techniques, thermal sensing, pressure sensing, capacitive sensing and skin resistance sensing. However, essentially all available fingerprint sensors require a direct contact between the user's finger and the sensor. However, such solutions, with an "open" sensor area, is not suitable for household appliances, since this impairs the protection provided by the casing of the appliance.

WO 00/46756 discloses a household appliance, and in particular a washing machine, provided with an authorization control including a fingerprint sensor. The fingerprint sensor is of a type comprising an external sensing area, which is to be contacted by the finger, which presumably makes the sensing device rather expensive. However, the arrangement of the fingerprint sensor on the exterior surface of the casing of the household appliance impairs the impermeability of the appliance, and requires modifications of the construction of an appliance. Hereby, the appliance becomes less protected from the surrounding environment. Still further, by means of this access control, the use of the household appliance becomes more difficult and tedious for the user.

US 2005/0151620 discloses a similar approach, where access to a refrigerator or freezer is controlled by means of a biometric person-identifying device, and primarily a voice-recognition device. Further, EP 0 949 578 discloses a household appliance with a fingerprint scanner for access control. US 2004/0160335 also discloses a household appliance with an authorization control, wherein a fingerprint sensor with a capacitive sensing area is used. However, all these known apparatuses are affected with similar drawbacks and shortcomings as the first one discussed.

Consequently, there is a need for a household appliance with a person-identification device, which is easy to use, rather inexpensive to manufacture, and where does the person-identification device not significantly deteriorate other aspects of the household appliance, such as the impermeability of the casing.

SUMMARY OF THE INVENTION

It is an object of the present invention to overcome or at least alleviate the above-discussed problems, and to provide an improved household appliance.

This and other objects that will be evident from the following description is achieved by means of a household appliance a transparent casing element, said element being transparent to light of at least one wavelength in the infrared and visible area; and a fingerprint sensor mounted to the inside of an exterior surface of said casing element of the household appliance. The sensor comprises:

a light source emitting light for which said casing element is transparent;

a detector for detecting reflected light emitted from said light source; and a light guiding means for guiding emitted light from said light source towards the casing element and guiding light reflected at the exterior surface of the casing element to the detector, thereby enabling detection of a fingerprint image through said casing element.

The present invention is directed to a household appliance with an integrated fingerprint sensor, for use in access control, personalization, authorization etc for the user of the household appliance. Hereby, it becomes possible for the home appliances to recognize who is trying to use it and automatically suggest e.g. a certain profile for this user. The profile can be a set of parameters (options) or the like, and can be user specific or related to groups of users. Further, the profiles may be predefined and/or user defined. This function can also increase the safety, for example for avoiding use by children, which is especially useful for hazardous equipment such as stoves, ovens and wine keepers, etc.

Further, the present invention is concerned with a fingerprint sensing device which employs an optical imaging technique. This device implements a technique where light from a light source is directed into a light guiding means, such as one face of a glass prism, reflected from an exterior surface, and passed out from the light guiding means to be detected by a detector, such as a CMOS electronic camera or a CCD with associated optical elements. Thus, when a finger is placed on the exterior surface above the fingerprint sensor, reflection no longer takes place at positions where ridges of the finger contact the surface. Through this effect an optical image of the fingerprint can be detected by the detector.

The present invention enables sensing of the fingerprints remotely, i.e. through the casing of an appliance. Since the fingerprint sensor is arranged below the transparent casing element, there is no need to make holes and the like in the casing, or to mount sensors on the outside. Hereby, the casing of the household appliance can be maintained in an essentially intact condition, and without any adverse effects due to the installation of the fingerprint sensor. Thus, the impermeability and mechanical strength of the appliance casing can be maintained. The transparent casing element may advantageously constitute at least a part of a front panel or a top panel of the household appliance, such as the transparent or semi-transparent cooking plate of an oven. Preferably, the transparent casing element consists of a plate of plastic or glass, which is transparent to light, or at least to infrared and/or visible light.

Further, the fingerprint sensor of the present invention may be made relatively simple and inexpensive. In particular, the components included in the sensor may be relatively simple and inexpensive. For example, the light guiding means may comprise or contain a prism with one surface attached to the interior side of the transparent casing element. The prism is preferably trapezoidal in cross-section, and can be made of ordinary glass or plastic material. The prism of a special form, which will be described below, allows to decrease the overall dimensions of the fingerprint sensor, especially the total height (in cross-section) of the sensor. For example, the fingerprint sensor of such low height, is the most suitable to install behind the glass cover of a cooking surface that is generally a very compact appliance in terms of the height. The prism can be attached to the interior side of the transparent casing element by means of e.g. transparent glue. Further, the light source can e.g. comprise at least one light emitting diode (LED), and preferably a group or matrix of such LEDs. The LEDs may be conventional general-purpose LEDs, and preferably adapted to emit infrared light in the approximate wavelength range 0.75 µm-1.0 mm, and preferably light with a nominal wavelength in the range 850±20 nm. Still further, the detector may comprise a plurality of detector pixels, and preferably a CMOS camera.

Still further, the fingerprint sensor can be made relatively compact and small, which makes it easy to incorporate the device in conventional household appliances.

Thus, the present invention requires less space within the appliance. Further, since an existing surface of the appliance may be used, it is possible to install the fingerprint sensor without considerably change the existing construction of the appliance. Also, the fingerprint sensor may be made simple and inexpensive to install. Also, no dedicated opening in the casing of the appliance is required for the fingerprint sensor, whereby the impermeability and mechanical strength of the casing can be maintained.

Preferably, the light source and the detector are both oriented in a direction essentially perpendicular or in parallel to the exterior surface of said transparent casing element. Further, the light source and the detector can be arranged on a common PCB (Printed Circuit Board), being arranged essentially parallel to said transparent casing element. This embodiment can be made particularly compact and small. The light source and the detector can also be arranged on a part of an already existing control board of the appliance.

The fingerprint data received by the fingerprint sensor may be processed in various ways, which are per se well known in the art. For example, the fingerprint data may be forwarded to a recognition engine, comprising a software module that processes the received fingerprint image and extracts key features of the fingerprint, and subsequently matches those key features with the content of a recognizer's database, with pre-stored fingerprint image data. Accordingly, the recognition engine can be considered separately from the fingerprint sensor, and may have a picture or image as the input and an index of detected users as the output. Such recognition engine are per se commercially available.

It is further preferred that the household appliance comprises a touch pad panel arranged on the transparent casing element. In this case, the fingerprint sensor may advantageously be combined with an on/off switch for said household appliance, thereby enabling personalization of the household appliance immediately upon activation. Since consumers already have a habit and experience to use such a touch pad, and to activate and control the household appliance simply by touching some region on the panel, this makes the fingerprint identification process easy to apprehend and use. In particular, replacing one of such conventional touch pads, e.g. the "On/Off" button, by a fingerprint sensor does not require any changes of usage at all, and enables the simultaneous fingerprint identification and control of the household appliance. This way to operate the user detection function by a fingerprint is very simple and native.

The present invention is usable in a many different types of household appliances, but may e.g. be used in one or several of an oven, a microwave oven, a refrigerator, a freezer, a dishwasher, a laundering machine, and a tumbler dryer.

BRIEF DESCRIPTION OF THE DRAWINGS

These and other aspects of the present invention will now be described in more detail, with reference to the appended drawings showing currently preferred embodiments of the invention.

DETAILED DESCRIPTION OF CURRENTLY PREFERRED EMBODIMENTS OF THE INVENTION

Figure 1A:
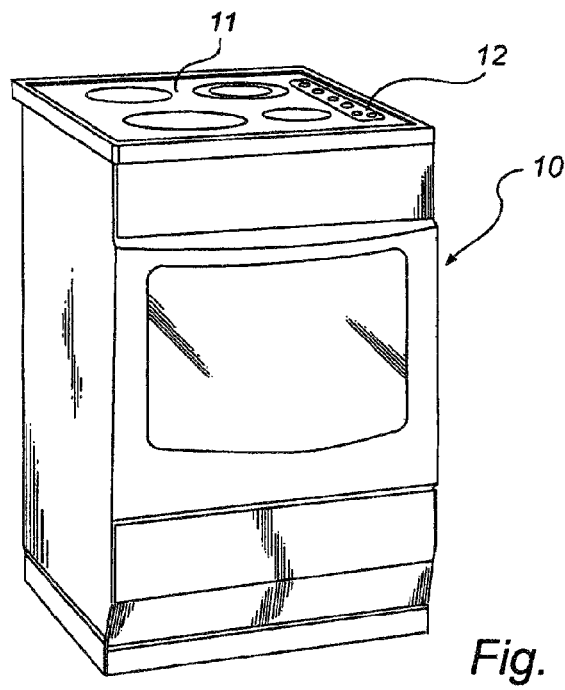
FIGS. 1a-c schematically illustrates the basic principle of household appliances with integrated fingerprint sensors according to embodiments of the invention.
Figure 1B:
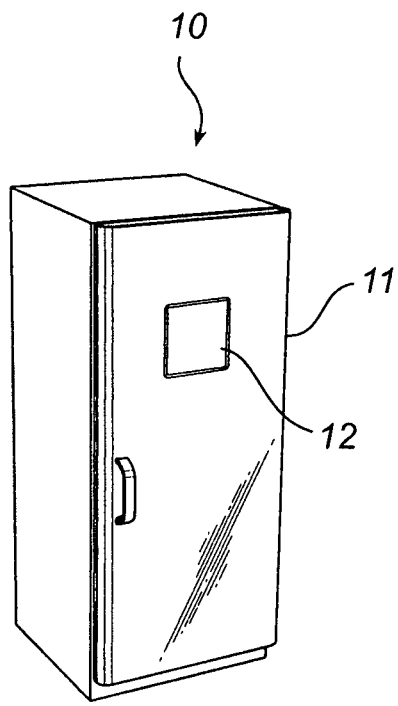
Figure 1C:
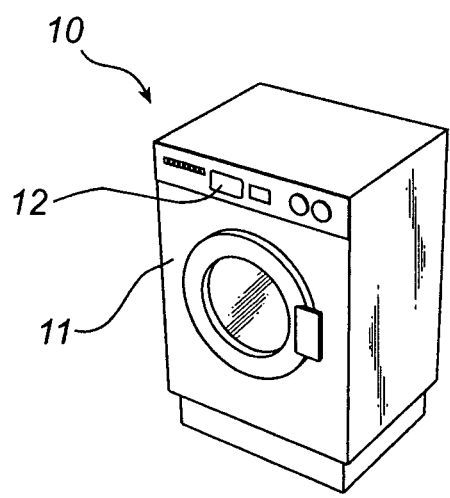

FIG. 1a-c schematically illustrates household appliances 10 with integrated fingerprint sensors according to embodiments of the invention.

Each household appliance 10 comprises an exterior casing 11 of the household appliance 10, at least part of which forms a transparent casing element 12. The transparent casing element 12 preferably forms a flat surface, and is preferably arranged as a top or front panel of the household appliance 10.

Figure 2:
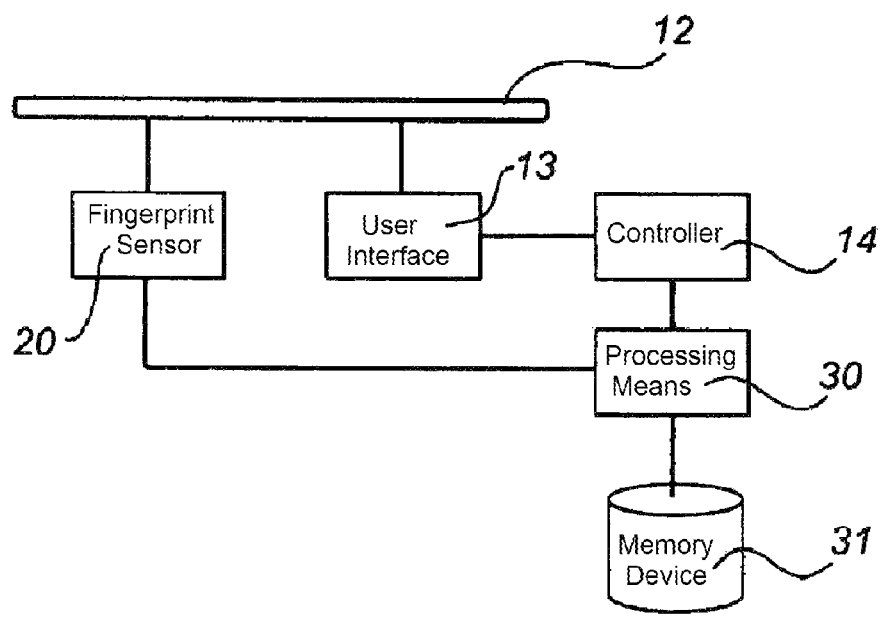
FIG. 2 schematically illustrates a block diagram of the control system of the household appliances of FIG. 1.

The control system of the household appliance 10 is illustrated in more detail in FIG. 2. The appliance comprises a user interface 13, which may be arranged as a touch pad or the like, The transparent casing element 12 is a part of the user interface 13. However, alternatively, the user interface may be arranged in other ways, and on other parts of the casing of the appliance. The user interface is connected to a controller 14 for controlling the ordinary operation of the appliance. Both the user interface 13 and the controller 14 are per se well known in the art, and will not be described in any detail in the following.

The control system further comprises a fingerprint sensor 20 and a fingerprint processor 30. The fingerprint sensor 20 receives a fingerprint image from a finger brought in contact with the transparent casing element 12, and forwards data related to this received fingerprint image to the fingerprint processor 30. The fingerprint processor 30 analyzes the received fingerprint data, e.g. by matching said data to pre-stored fingerprint data from a memory device 31. The matching can result in identification of the user as a known user, or as an unknown user. Based on this information, the fingerprint processor 30 can control the operation of the household appliance 10, either directly, or by forwarding the relevant information to the controller 14. Hereby, personalization, authentication, etc for the household appliance is rendered possible, as is per se known in the art.

The fingerprint sensor 20 is an optical sensor which employs an optical imaging technique, where light is directed towards the exterior surface in contact with the finger, reflected from said exterior surface, and passed on to be detected. Thus, when a finger is placed on the exterior surface above the fingerprint sensor, reflection no longer takes place at positions where ridges of the finger contact the surface. Through this effect an optical image of the fingerprint can be detected. This technique can be used for surfaces that passes light, and preferably visible or infrared light. Such surfaces can e.g. be a plate of transparent or toned plastic or colored, and even grooved glass.

The fingerprint sensing is hereby based on the effect of Frustrated Total Internal Reflection (FTIR). The effect of FTIR means that the light beam cannot go out from a medium with higher optical density $n_1$ to a medium with lower optical density $n_2$, if the beam is oriented at an angle to the border surface of two mediums which is less than $\gamma_m$:

$$\cos(\gamma_m) = n_2/n_1$$

The optical density of air is much lower then the optical density of the skin of human fingers. Hence, if there is an effect of FTIR on the border between a plate element and air, this effect is altered where the skin is in contact with the plate surface. When the finger touches the surface, only the ridges will be in contact with the surface, whereas the valleys remain at certain distance, whereby a fingerprint image may be determined from the reflected light.

Figure 3:
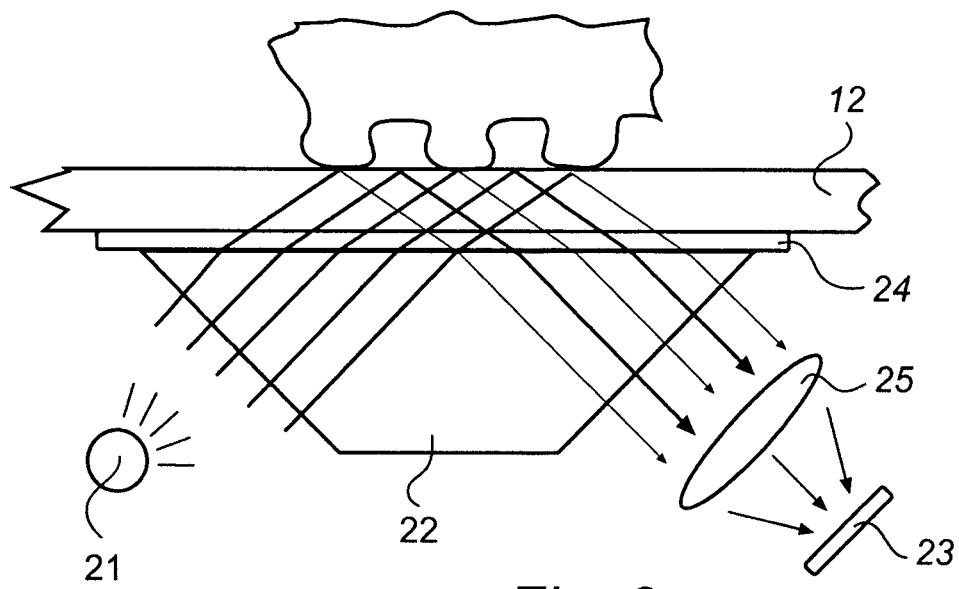
FIG. 3 schematically illustrates a fingerprint sensor according to a first embodiment of the present invention.

Referring now to e.g. FIG. 3, the fingerprint sensor comprises a light source 21, a light guiding means 22 and a detector 23. The light guiding means 22 is connected to the transparent casing element 12, and the casing element is transparent at least to the light emitted from the light source 21, such as e.g. infrared light.

The light guiding means is attached on the inside surface of the transparent casing element, preferably by means of transparent (optical) glue 24. Further, a focusing lens 25 or the like may be arranged before the detector, in order to focus the reflected light.

The light guiding means 22 is preferably a prism with one surface attached to the interior side of the transparent casing element. The prism is preferably trapezoidal in cross-section, and can be made of ordinary glass or plastic material.

The light source 21 can e.g. comprise at least one light emitting diode (LED), and preferably a group or matrix of such LEDs. The LEDs may be conventional general-purpose LEDs, and preferably adapted to emit infrared light in the approximate wavelength range 0.75 µm-1.0 mm, and preferably light with a nominal wavelength in the range 850±20 nm.

By using infrared light, transparent casing elements that passes only infrared light may be used. For example, such surfaces are cooking surfaces made of colored glass and front panels of the touch pad user interfaces made of transparent but toned plastic.

The light source preferably illuminates one side of the prism with a diffused light. Such diffuse light may e.g. be generated by a matrix of chip infrared LEDs. The light entering the prism is reflected at the finger contact area. The lack of reflection allows the ridges (which appear dark in the image) to be discriminated from the valleys (appearing bright). The light beams exit at the other side of the prism and are focused through a lens onto the detector.

The detector may comprise a plurality of detector pixels, and preferably a CMOS camera or a CCD. For normal use, the resolution of the detector need not be very high. Consequently, relatively cheap detectors can be used, such as the type of CMOS cameras that is now widely used in the PDAs, Mobile phones, PC Web cameras, etc. Such cameras usually have the internal controller and the focusing lens integrated, which simplifies the schematic design and the mechanical construction.

However, cheap CMOS cameras have low sensitivity to the infrared light. Thus it is advantageous to use backlight of infrared or near infrared close to the visible light range. An optimal value of the nominal wavelength of the backlight LEDs is assumed to be 850±20 nm. The resolution of the camera may e.g. be as low as 320×240 pixels, and a monochrome (grayscale) camera may be used.

The infrared LEDs and the CMOS camera can mounted to an internal PCB placed in parallel with the surface of the transparent casing element 12. The infrared light from the LEDs is deflected by the prism and comes to the finger contact area at a certain angle. Thanks to the Frustrated Total Internal Reflection (FTIR), the light is reflected and may subsequently be received by the camera.

The light must go out from the prism, go inside the surface of the transparent casing element (e.g. colored glass, toned plastic, etc.), be reflected from the fingerprint area on the exterior surface, returned to the prism and be focused on the camera. There should preferably be only one effect of FTIR, viz. on the border between the exterior surface and air. Accordingly, the connection 24 between the light guiding means 22 and the transparent casing element 12 is preferably made such that no FTIR is generated. Thus, if a transparent (optical) glue is used, the quality of gluing is preferably high enough to avoid air bubbles between the prism and the surface. Further, the material of glue is preferably transparent to the light used, such as near infrared light (~850 nm). The optical density of the glue $n_G$ is preferably close to the optical density of the prism $n_P$ and to the one of the transparent casing element $n_S$. Thus, preferably only one effect of FTIR occurs.

The prism can be glued even to a grooved, i.e. not plane, surface, such as a glass of a cooking surface. In this case the glue reduces an influence of the surface imperfections to the resulting fingerprint image. For this reason the optical density of the glue is preferably as close as possible to the optical density of the transparent casing element (e.g. grooved glass). Preferably, this criterion is matched at least at the wavelength of backlight used. Ideally, the optical density of the glue and of the said element should be the same. However, the value of such optical density may be different from the optical density of the light guiding means.

The layer of glue is preferably not very thin. The thickness of the connection 24 is in a preferred embodiment about 1 mm. A certain thickness of the glue layer prevents an optical contact to be affected by heating up or cooling down an area of the fingerprint sensor. Because of different thermal expansion of the transparent casing element 12, the glue layer 24 and the light guiding means 22, a homogeneous optical contact can more easily maintained if the layer 24 is thick enough to avoid the local imperfections (breaks, holes, air bubbles) to appear.

The optical glue is preferably a glue with enhanced temperature resistance. Thus, the glue is preferably tolerant and durable to the high temperature which may arise during the normal operation of, for example, an oven, a stove or a cooking surface. Hence the optical glue is preferably a glue with UV-polymerization. The use of a glue with UV-polymerization allows not only to extend the operating temperature range of the fingerprint sensor, but also to dramatically decrease the time needed for the glue to get polymerized and dried. The optical glues with UV-polymerization (and with customized or specific refractive index at the wavelength of backlight used) are per se commercially available. The most of such glues can get dried rapidly, within a few minutes of UV exposition, which is an important advantage for industrialization and production processes. A prism with a triangular cross-section may be used. However, in a preferred embodiment, a prism with a trapezoidal cross-section is used instead. Such an embodiment is illustrated in FIG. 3. The suitable length of the prism $L_P$ mainly depends on the thickness of the transparent casing element $W_S$, its optical density $n_S$ and the optical density of the glue $n_G$. For typical ranges of $W_S$, $n_S$ and $n_G$ an optimal value of $L_P$ can be calculated and checked experimentally.

Figure 4:
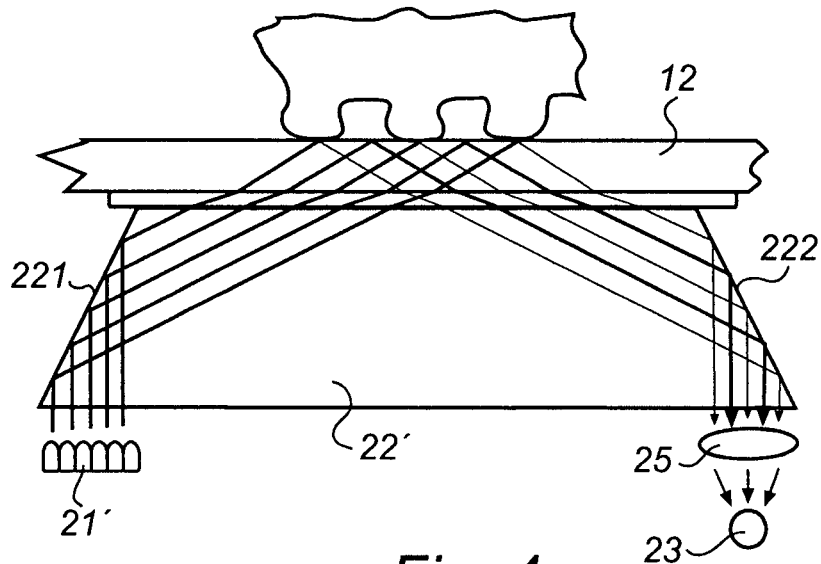
FIG. 4 schematically illustrates a fingerprint sensor according to a second embodiment of the present invention.

In the embodiment discussed above in connection with FIG. 3, the detector and the light source are oriented at different angles. In some applications this is a disadvantage, since it can make the structure more complicated and increase the overall dimensions. In another embodiment, illustrated in FIG. 4, an alternative solution is provided, in which the detector 23 and the light source 21' are directed at the same angle, essentially perpendicular to the transparent casing element 12. In this embodiment a trapezoid prism 22' with another angle is used, whereby the light beams will also be essentially totally reflected from the side facets 221, 222.

Figure 5:
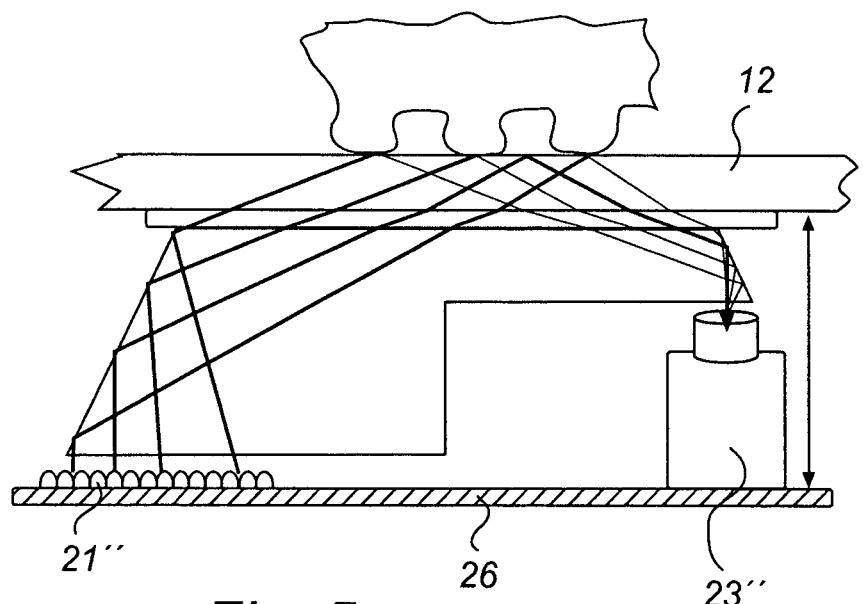
FIG. 5 schematically illustrates a fingerprint sensor according to a third embodiment of the present invention.

In the embodiment illustrated in FIG. 5 an even more compact fingerprint sensor is disclosed. In this embodiment the light source 21" is a matrix of chip infrared LEDs and the detector 23" is a CMOS camera module. The matrix of chip infrared LEDs and the CMOS camera module are further arranged on a common PCB 26. This arrangement is particularly suitable for mass production. The PCB 26 is arranged in parallel to the transparent casing element 12. This PCB can further be integrated with the UI board of the appliance, such as the UI board of a cooking appliance that has a touch pad working through the glass surface.

In many applications it is important to decrease the total height of the fingerprint sensor, in order to minimize the distance between the UI board and the transparent casing element and the exterior surface. In the embodiment of FIG. 5, the height is reduced by removing the focusing lens and to use a prism of a special form. In the prism of this embodiment the height of the prism is larger at the side arranged over the light source 21" and lower at the side arranged over the detector 23". In this type of embodiment, the height of the prism can be as low as about 20 mm, and still provide an adequate width of the visible area for the fingers on the exterior surface. If the visible area for the fingers is assumed as rectangular, the corresponding camera image will be trapezoid. Such trapezoid image is only a part of the frame viewed by the camera. However, such image can be algorithmically transformed to restore an original form of the fingerprint by pre-processing of the image.

Preferably, some facets of the prism are clear and transparent whereas others may be lustreless. Advantageously, all facets that are on the path of light beams from the visible area for the fingers to the detector are polished. Contrarily, the facets on the path of beams from the LEDs need not be polished, but are preferably left lustreless or unpolished in order to make an absolutely diffused highlight for the visible area for the fingers. Hereby, a uniform and monotonous white image will be provided for the situation where no finger is in contact with this visible area. In case of a finger being in contact with the surface, there will be dark lines related to the ridges of the skin of the finger. All other facets can be left lustreless (not polished) as well, which may simplify the manufacture of the prism.

The prism 22" of a special form as shown in FIG. 5 is made from a relatively large piece of original glass or transparent plastic. Moreover, the form-factor of the prism 22" is not convex, because there is a rectangular cutting of an original prism with trapezoid cross-section. Due to these circumstances, the prism 22" may be more expensive for production. According to another embodiment of the present invention, it is possible to overcome these disadvantages by using two small and convex prisms instead of a big, non-convex one.

Figure 6A:
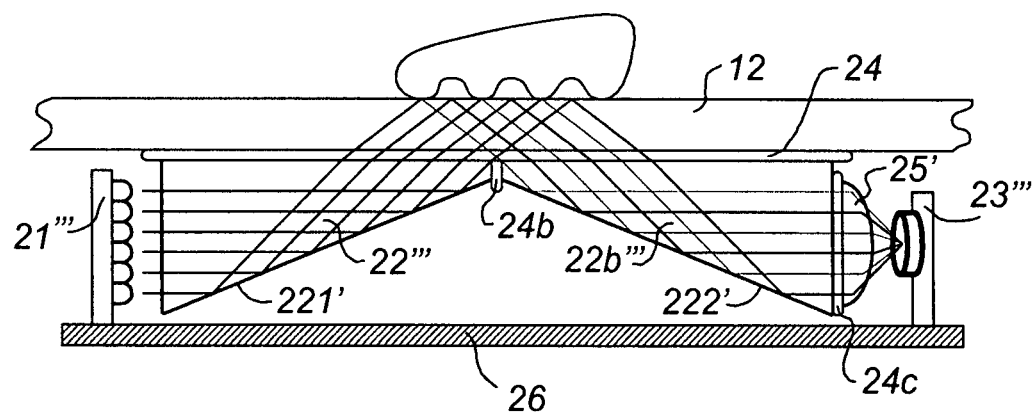
FIGS. 6a and 6b schematically illustrate a fingerprint sensor according to a fourth embodiment of the present invention.

With reference to FIG. 6a, the dimensions of the visible area for the fingers on the exterior surface of the transparent casing element 12 remain essentially unchanged. Two, preferably identical, convex prisms 22'" and 22b'" with trapezoid cross-section are attached to the interior surface of the element 12. The prisms 22'" and 22b'" have a simple form and relatively small dimensions. Hence the total cost of the prisms 22'" and 22b'" can be lower than the cost of the single but complicated prism 22" on FIG. 5. Before attaching the prisms to the casing element 12, the prisms 22'" and 22b'" are preferable connected to each other by means of a glue layer 24b. A piano-convex focusing lens 25' is further preferably attached to the side facet of one of the prisms. For example, as shown on FIG. 6a, the focusing lens 25' is attached to the right facet of the prism 22b'" by means of the glue layer 24c. Preferably, the glue layers 24b and 24c have the same optical density as the prisms themselves.

A light guiding means, which consists of two prisms 22'" and 22b'" and the focusing lens 25', is further attached to the transparent casing element 12 by means of the glue layer 24. Preferably, an optical density of the glue layer 24 is equal to the optical density of the casing element 12.

The light beam emitted by the matrix of LEDs 21'" is oriented in parallel to the casing element 12. This beam is further totally reflected from the facet 221' and is forwarded to the exterior surface of the casing element 12 at an appropriate angle. Having been reflected from the exterior surface, the light beam is further totally reflected from the facet 222' so to exit from the light guiding means in a horizontal direction, as shown on FIG. 6a. A focusing lens 25' focuses the outgoing beam to the camera 23'".

The light source 21'", which is a small matrix of LEDs, and the camera 23'" can for example be the small PCBs to be installed perpendicularly to the main electronic board 26, which in turn can be a part of UI board with the other controls (e.g. displays, indicators, touch buttons, etc), wherein the UI board is fixed in parallel to the casing element 12.

The fingerprint sensor described with reference to FIG. 6a has generally small overall dimensions and, in particular, a very low height. At the same time, the light guiding means are relatively inexpensive, since it comprises the optical components of a convex and simple form-factor.

Figure 6B:
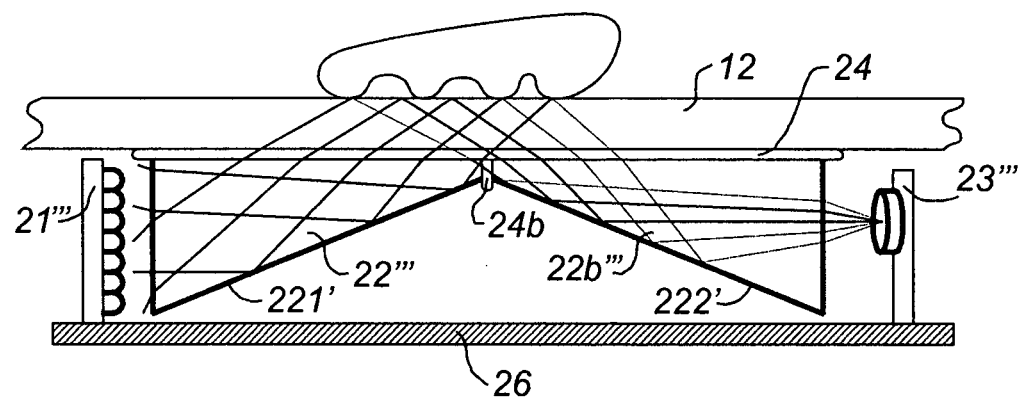

In a further advantageous embodiment, the focusing lens 25' of the embodiment described in relation to FIG. 6a may be omitted from the light guiding means without significantly altering the fingerprint sensing capability. FIG. 6b illustrates such a preferable fingerprint sensor and shows the corresponding directions of the light beams.

Figure 7:
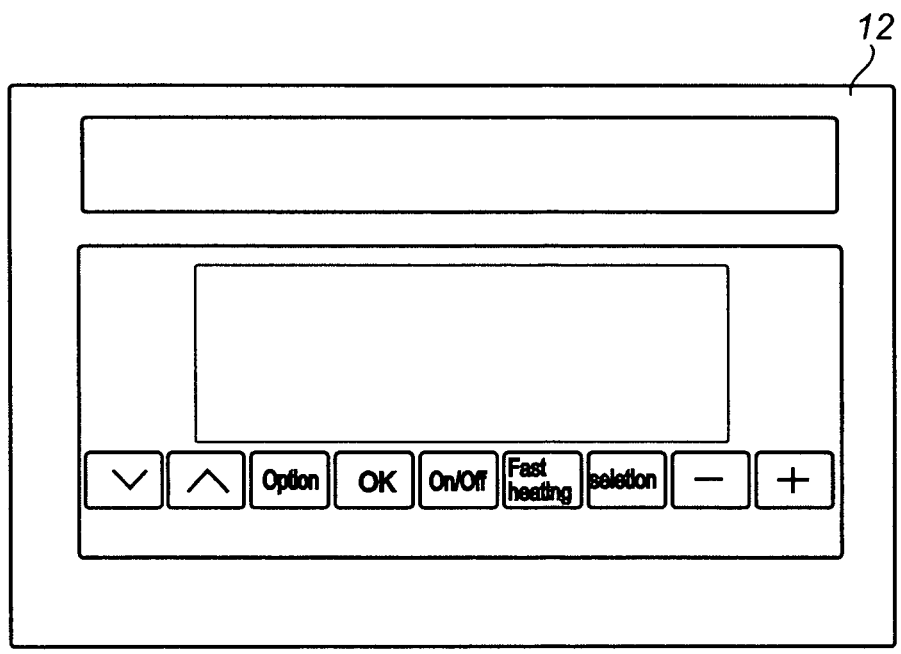
FIG. 7 illustrates a touch pad user interface board of a household appliance, in which the present invention may be incorporated.

In preferred embodiments, the fingerprint sensor is combined with a control button for controlling the appliance, such as a touch pad or a touch panel. Hereby, detection of a fingerprint may be performed at the same time as the user performs ordinary control of the appliance. The control functionality to be combined with the fingerprint detection can be chosen in various ways, but preferably the fingerprint detection is combined with a power on/off control button. An example of such a touch pad panel for a household appliance in which the fingerprint detection can be integrated is illustrated in FIG. 7.

For the fingerprint recognition, fingerprints corresponding to a number of users may be pre-stored in a memory device of the household appliance, in order to match a detected fingerprint to different users. In addition, it is possible to store the fingerprints of different fingers of a user, and preferably all the five fingers of the user's hand. Hereby, an appliance can be able to detect by which finger the user is touching the sensor. In this case, it is also possible to activate different control functions in dependence on the finger that has been used. This is an example of a control "button" that has several, and preferably five, different meanings. Fast selection of user-defined cycles or programs can hereby be accomplished.

Additionally, the fingerprint image processor 30, as shown on FIG. 2, can provide some advanced features like calculation of the angle and exact position of the applied finger among the visible area of the sensor. The control system of a household appliance, which is shown on FIG. 2, can for example be able to detect and track a finger being moved along the sensor. Hence the fingerprint sensor can act as a touch pad. This feature can be adapted and used to enrich the user interface, making it more simple and usable. As an example, the user can move the finger along the sensor in order to select, for instance, the temperature or duration of a cooking program, or to scroll through items of an interactive menu system provided by the user interface. If the user moves the finger forward, this may result in an increment of the value of a parameter like temperature, duration, index of a program, etc. Contrarily, if the consumer moves the finger backward, this may result in a decrement of the value of the same parameter.

The button realized by the fingerprint sensor is much more reliable than the button realized by a touch pad. For example, it is possible to ensure that it is really a human who is touching the sensor area, and not an animal, a piece of dish, a big vegetable, etc.

The person skilled in the art realizes that the present invention by no means is limited to the preferred embodiments described above. On the contrary, many modifications and variations are possible within the scope of the appended claims.

The invention claimed is:

1. A household appliance (10), having:
   an exterior protective casing (11) covering operable components of the household appliance (10);
   a transparent casing element (12) transparent to light of at least one wavelength in the infrared or visible area, wherein the transparent casing element (12) is an integrated portion of the exterior protective casing (11), thereby maintaining an impermeable surface of the exterior protective casing (11); and
   a fingerprint sensor (20) arranged below the transparent casing element (12) and mounted to the inside surface of said transparent casing element (12), said fingerprint sensor (20) comprising:
   a light source (21; 21'; 21"; 21'") emitting light of at least one wavelength in the infrared or visible area for which said transparent casing element (12) is transparent;
   a detector (23; 23"; 23'") for detecting reflected light emitted from said light source (21; 21'; 21"; 21'"); and
   a light guiding means (22; 22'; 22"; 22'"; 22b'") for guiding emitted light from said light source (21; 21'; 21"; 21'") towards the transparent casing element (12) and guiding light reflected at the exterior surface of the transparent casing element (12) to the detector (23; 23"; 23'"), thereby enabling detection of a fingerprint image through said transparent casing element (12),
   wherein the transparent casing element (12) is a part of a user interface (13) for controlling the operation of the household appliance (10) and wherein the fingerprint sensor (20) is combined with the user interface (13).

2. The household appliance of claim 1, wherein the transparent casing element (12) constitutes at least a part of a front panel or a top panel of the household appliance, wherein the transparent casing element (12) covers said fingerprint sensor (20) and a component within the interior space of said household appliance.

3. The household appliance of claim 1, wherein the household appliance (10) is one of an oven, a microwave oven, a refrigerator, a freezer, a dishwasher, a laundering machine, and a tumbler dryer.

4. The household appliance of claim 1, wherein the household appliance (10) is an oven, and wherein the transparent casing element (12) is a cooking plate of said oven.

5. The household appliance of claim 1, wherein the light source (21; 21; 21"; 21'") is adapted to emit infrared light.

6. The household appliance of claim 1, wherein the light source (21; 21'; 21"; 21'") comprises at least one light emitting diode (LED).

7. The household appliance of claim 1, wherein the transparent casing element (12) consists of a plate of plastic or glass.

8. The household appliance of claim 1, wherein the light guiding means (22; 22'; 22"; 22'"; 22b'") comprises at least one prism with one surface attached to the interior side of the transparent casing element (12).

9. The household appliance of claim 8, wherein the prism is attached to the interior side of the transparent casing element (12) by means of transparent glue (24).

10. The household appliance of claim 8, wherein the prism is trapezoidal in cross-section.

11. The household appliance of claim 10, wherein the light source and the detector are both oriented in a direction essentially perpendicular or essentially parallel to the exterior surface of said transparent casing element.

12. The household appliance of claim 1, wherein the detector comprises a plurality of detector pixels.

13. The household appliance of claim 1, wherein the light source and the detector are arranged on a common printed circuit board (PCB) (26).

14. The household appliance of claim 1, further comprising a memory device (31) for storing of pre-stored fingerprint image data, and processing means (30) for comparing detected fingerprint image data with said pre-stored image data.

15. The household appliance of claim 1, further comprising a touch pad panel arranged on said transparent casing element.

16. The household appliance of claim 14, wherein the fingerprint sensor is combined with an on/off switch for said household appliance, thereby enabling personalization of the household appliance immediately upon activation.

17. The household appliance of claim 5, wherein the infrared light includes light with a nominal wavelength in the range of about 850±20 nm.

18. The household appliance of claim 1, wherein the detector comprises a complementary metal oxide semiconductor (CMOS) camera.

19. The household appliance of claim 13, wherein the PCB (26) is arranged essentially parallel to said transparent casing element (12).

20. A household appliance (10), having:
   an exterior protective casing (11) covering operable components of the household appliance (10);
   a transparent casing element (12) formed as an integrated portion of said exterior protective casing (11) thereby maintaining an impermeable surface of the exterior protective casing (11), said transparent casing element (12)

being transparent to light of at least one wavelength in the infrared or visible area; and a fingerprint sensor (20) arranged below the transparent casing element (12) and mounted to the inside surface of said transparent casing element (12), said fingerprint sensor (20) comprising:

a light source (21; 21'; 21"; 21''') emitting light of at least one wavelength in the infrared or visible area for which said transparent casing element (12) is transparent;

a detector (23; 23"; 23''') for detecting reflected light emitted from said light source (21; 21'; 21"; 21'''); and a light guiding means (22; 22'; 22"; 22'''; 22b''') for guiding emitted light from said light source (21; 21'; 21"; 21''') towards the transparent casing element (12) and guiding light reflected at the exterior surface of the transparent casing element (12) to the detector (23; 23"; 23'''), thereby enabling detection of a fingerprint image through said transparent casing element (12), wherein the transparent casing element (12) is a cover for the fingerprint sensor (20) and is a portion of the exterior protective casing (11), negating the need for making holes or openings through the exterior protective casing (11) for mounting the fingerprint sensor (20) or for mounting the fingerprint sensor (20) on the outside of the exterior protective casing (11), wherein the transparent casing element (12) is a part of a user interface (13) for controlling the operation of the household appliance (10) and wherein the fingerprint sensor (20) is combined with the user interface (13).

\* \* \* \* \*